No. 838,561.  PATENTED DEC. 18, 1906.
W. H. MINER.
DRAFT RIGGING FOR RAILWAY CARS.
APPLICATION FILED JULY 12, 1906.
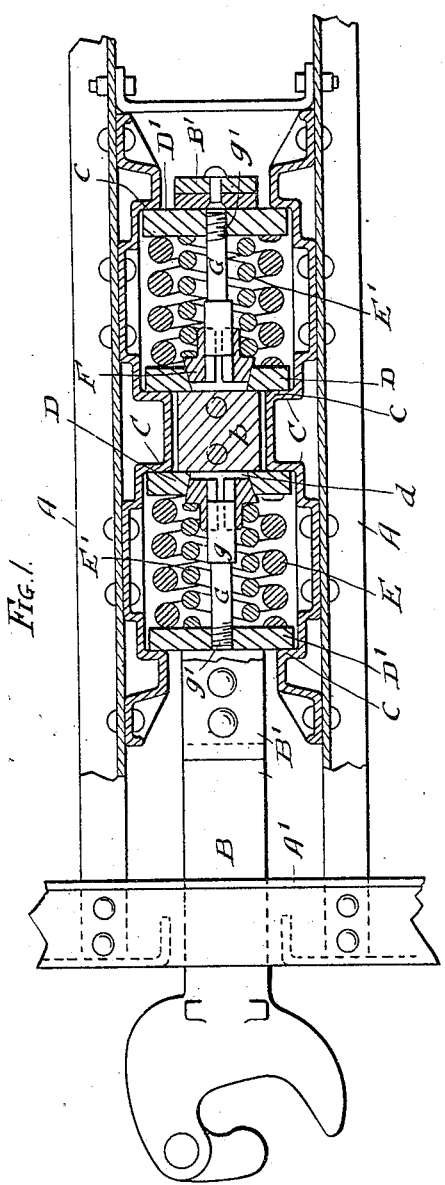
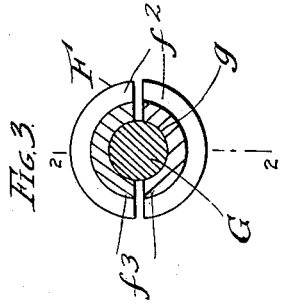
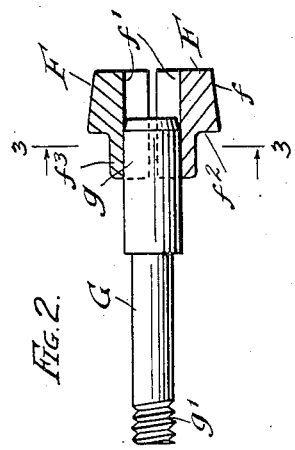
Witnesses:
F. B. Townsend
A. W. Munday
Inventor:
William H. Miner
By
Munday, Evarts, Adcock & Clarke,
his Attorneys

UNITED STATES PATENT OFFICE.

WILLIAM H. MINER, OF CHICAGO, ILLINOIS, ASSIGNOR TO W. H. MINER COMPANY, OF CHICAGO, ILLINOIS, A CORPORATION OF ILLINOIS.

DRAFT-RIGGING FOR RAILWAY-CARS.

No. 838,561.     Specification of Letters Patent.     Patented Dec. 18, 1906.

Application filed July 12, 1906. Serial No. 325,806.

*To all whom it may concern:*

Be it known that I, WILLIAM H. MINER, a citizen of the United States, residing in Chicago, in the county of Cook and State of Illinois, have invented a new and useful Improvement in Draft-Rigging for Railway-Cars, of which the following is a specification.

My invention relates to improvements in draft-rigging for railway-cars.

The object of my invention is to provide a tandem-spring draft-rigging for railway-cars of a strong, simple, efficient, and durable construction having means for retarding the reaction of the springs and consequent return movement of the followers after the springs are compressed and in which, in addition to the cushioning action of the springs, the draft-rigging will also have a frictional cushioning action.

My invention consists in the means I employ to practically accomplish this object or result—that is to say, it consists, in connection with the draw-bar, draw-bar strap, side plates or stop-castings, followers, and inner and outer tandem-arranged springs, of a split collar or sleeve having a wedging engagement with one of the followers and against which the inner or smaller spring bears at one end and a friction spindle or stem secured to the opposite follower and having a frictional engagement with said split collar or sleeve. The split collar or sleeve is preferably made in two parts or segments, although it may be made in a greater number of segments, if desired, and it preferably has a tapering or conical face fitting in and engaging the conical or tapering opening in the follower in which the split sleeve or collar is mounted. One of the followers of each of the two sets of tandem-arranged springs is preferably provided with a tapering opening and a split sleeve or collar fitting therein and coöperating with a friction spindle or stem secured to the opposite follower. By this simple construction and combination of parts the cost of the draft-rigging is not materially increased over that of the ordinary tandem-spring draft-rigging and at the same time ample provision is made for retarding the reaction of the springs after they are compressed and also for producing a frictional resistance, which materially adds to the cushioning power of the springs.

My invention also consists in the novel construction of parts and devices and in the novel combinations of parts and devices herein shown and described.

In the accompanying drawings, forming a part of this specification, Figure 1 is a plan view, partly in horizontal section, of a draft-rigging embodying my invention. Fig. 2 is a detail view, partly in section, on line 2 2 of Fig. 3, showing the split sleeve or collar and the friction spindle or stem; and Fig. 3 is a detail cross-section on line 3 3 of Fig. 2.

In the drawings like letters of reference indicate like parts.

In said drawings, A represents the center sills or frame pieces of a car to which the side plates or stop-castings of the draft-rigging are applied, and A' the front or end sill.

B is the draw-bar of the coupler, and B' the draw-bar extension, strap, or yoke, the same having an abutment $b$ to engage the intermediate followers.

C C are the side plates or stop-castings of the draft-rigging, having the customary stops or shoulders $c$ for the followers to abut against.

D D' are the followers, and E E' and E E' are two sets of tandem-arranged springs, the smaller springs E' of each set fitting within the larger springs E, as is customary. One of the followers D of each pair is furnished with a tapering or wedging opening $d$ to receive the tapering or wedging split collar or sleeve F. The split collar or sleeve F is preferably made in two segments or parts, although the number of its segments or parts is immaterial. Each of the split sleeves or collars F has a conical tapering or wedging face $f$ to engage the corresponding tapering or wedging face of the opening $d$ in the follower D. Each of the split sleeves or collars F is also furnished with an inner friction face or surface $f'$, which may preferably be cylindrical and which engages the corresponding friction-face $g$ of the spindle or stem G, which is rigidly secured to the opposite follower D', it being preferably so secured by screw-threads $g'$. The split sleeve or collar F is preferably made of steel drop-forging, and the friction stem or spindle G is also preferably of drop-forged steel. Each of the split sleeves or collars F is furnished with a shoulder or seat $f^2$, against which the inner spring E' bears at one end, and with a part $f^3$, fitting inside the spring E' to better center or support the spring.

In operation when the inner coiled spring E' is compressed by the followers D D' it causes the split sleeve or collar F to enter the tapering or wedging opening in the follower D, and thus causes the split collar or sleeve F to frictionally grip the friction spindle or stem G, and thus add to the cushioning power of the springs by this frictional resistance, and also to serve as a means of retarding or checking the reaction of the springs after the springs are compressed when they are relieved from pressure.

I claim—

1. In a tandem-spring draft-rigging, the combination with the draw-bar and draw-bar strap or extension, of side plates or stop-castings, inner and outer tandem-arranged springs and followers, one of the followers for each set or pair of springs having a tapering or wedging opening therein, split sleeves or collars fitting in said tapering or wedging openings in said followers and having tapering or wedging faces coöperating therewith, and provided with inner friction-faces and friction stems or spindles engaging the friction-faces of said split sleeves or collars and secured to the opposite followers, one of the springs of each set or pair bearing directly at each end against a follower and the other spring of each pair bearing at one end against a follower and at its opposite end against said split sleeve or collar substantially as specified.

2. In a draft-rigging, the combination with the draw-bar, inner and outer tandem-arranged springs, and followers, of a friction spindle or stem secured to one of the followers and a split friction sleeve or collar engaging said friction-stem and having a tapering or wedging face engaging a tapering or wedging face on the follower opposite to the one to which said friction spindle or stem is secured, one of the springs of each set or pair bearing directly at each end against a follower and the other spring of each pair bearing at one end against a follower and at its opposite end against said split sleeve or collar substantially as specified.

3. In a draft-rigging, the combination with a draw-bar, followers and inner and outer springs, one of the followers having a tapering opening therein, a split friction-collar having a tapering or wedging face fitting in said tapering opening of said follower and provided with a shoulder or seat against which the inner spring abuts at one end and a friction stem or spindle secured to the other or opposite follower the outer spring bearing directly at both ends against said followers and the inner spring bearing at one end against one of said followers and at the other end against said split friction-collar, substantially as specified.

4. In a draft-rigging, the combination with a pair of followers, inner and outer springs between the followers, a friction-stem secured to one of the followers and a split friction-collar in frictional engagement with said friction-stem and having a seat or shoulder against which one of said springs bears at one end, said friction-collar having a tapering or wedging engagement with the follower opposite to the one to which said friction-stem is secured, one of said springs bearing at both ends directly against the followers and the other bearing at one end only against a follower substantially as specified.

5. In a draft-rigging, the combination with a pair of followers, of inner and outer springs between the followers, a friction device secured to one of the followers and a movable friction device operated by the other follower, one of said springs bearing at one end against said movable friction device and at its other end against the opposite follower and the other spring bearing directly at both ends against the followers, substantially as specified.

6. In a draft-rigging, the combination with a pair of followers, of inner and outer springs between the followers, one of said springs bearing at its ends against both said followers and a friction device against which the other spring bears at one end said other spring bearing at its other end against the opposite follower, substantially as specified.

7. In a draft-rigging, the combination with a pair of followers, of inner and outer springs between the followers, one of said springs bearing at its ends against both said followers and a friction device against which the other spring bears at one end said other spring bearing at its other end against the opposite follower, and connecting means for operating said friction device by movement of the followers, substantially as specified.

WILLIAM H. MINER.

Witnesses:
EDMUND ADCOCK,
PEARL ABRAMS.